United States Patent [19]

Dubray

[11] 4,429,485
[45] Feb. 7, 1984

[54] TRAP SETTING DEVICE

[76] Inventor: Norman Dubray, Box 72, Oak River, Manitoba, Canada, R0K 1T0

[21] Appl. No.: 362,768

[22] Filed: Mar. 29, 1982

[51] Int. Cl.³ .......................................... A01M 23/28
[52] U.S. Cl. ...................................................... 43/97
[58] Field of Search .................... 43/97, 96, 88, 58; 254/213, 264, 4 R, 4 B, 4 C; 242/96; 267/69, 74, 73; 29/244, 267, 270; 81/3 R

[56] References Cited

U.S. PATENT DOCUMENTS

| 642,476 | 1/1900 | McCoy | 43/97 |
| 656,540 | 8/1900 | Generous | 43/97 |
| 981,887 | 1/1911 | Schofield | 43/97 |
| 4,117,621 | 10/1978 | Loeffler | 43/88 |
| 4,245,424 | 1/1981 | Smith | 43/97 |

FOREIGN PATENT DOCUMENTS

| 139621 | 12/1950 | Australia | 43/97 |
| 478443 | 11/1951 | Canada | 43/97 |
| 1002 | of 1903 | United Kingdom | 43/97 |

Primary Examiner—Nicholas P. Godici
Assistant Examiner—Kurt Rowan
Attorney, Agent, or Firm—Stanley G. Ade

[57] ABSTRACT

Double spring traps such the conibear trap are difficult to set due to the heavy duty hairpin type springs on either side thereof. The present device consists of a crank, a length of cord or cable extending from the distal end portion of the crank and a spring ring anchor bar on the distal end of the cord or cable. The bar is fed downwardly through the upper loop and then through the lower loop and is positioned so that it cannot disengage from the lower loop. The crank is fulcrumed across the top loop and rotated thus winding the cord or cable about the distal end portion of the crank which shortens the cord or cable and gradually and safely pulls the two loops together so that the detachable locking clip normally provided, can be engaged over the arms to hold them in this position. The other spring is treated in a similar manner thus rendering the trap inoperative for baiting and setting purposes whereupon the clips can be removed.

7 Claims, 3 Drawing Figures

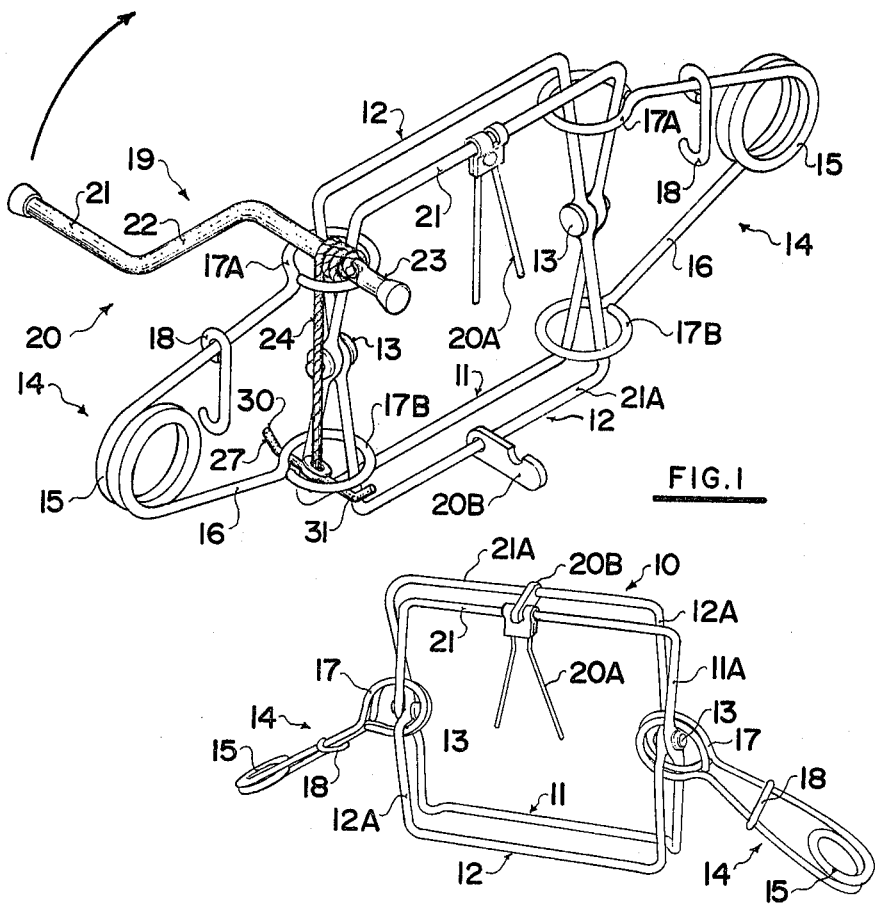
FIG. 1
FIG. 2
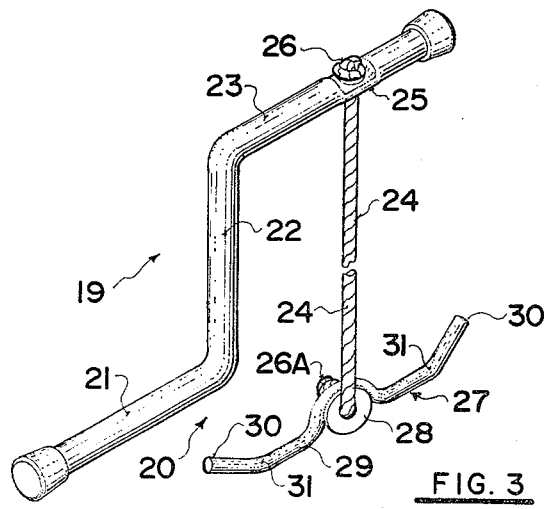
FIG. 3

TRAP SETTING DEVICE

BACKGROUND OF THE INVENTION

This invention relates to new and useful improvements in trap setting devices designed primarily for use with the conibear type trap.

Such traps comprise a pair of rectangular frames pivotally interconnected with one another and having heavy duty hairpin type springs on either side. When the trap is set, the springs react against the frames and force them through approximately 90° when the trap is sprung.

Such traps are difficult to set due to the strength of the hairpin type springs and it often happens that the operator catches his hand or arm in the trap when the springs let go before the conventional hook can be engaged over the two arms thus making the spring inoperative while the trap is baited and set in position.

SUMMARY OF THE INVENTION

The present invention overcomes these disadvantages by enabling the two arms to be moved towards one another readily and easily so that the guard hooks can be engaged thus rendering the trap inoperative.

In accordance with the invention there is provided in a trap of the conibear type which includes a pair of stantially rectangular frames pivotally interconnected with one another intermediate the ends of opposing sides thereof, a heavy duty hairpin type spring assembly operatively connected with the said opposing sides to move the frames from the set position to the sprung position, said spring having a pair of arms with frame side engaging rings secured to the distal ends thereof; a trap setting device, said device comprising a crank handle having a hand engaging portion, an intermediate portion extending from one end of said hand engaging portion and a distal end portion spaced and parallel to said hand engaging portion and extending offset from the other end of said intermediate portion, a winding cord or cable secured by one end to intermediate the ends of said distal end portion and a spring ring engaging member on the distal end of said cord or cable.

In another aspect of the invention there is provided a method of setting traps of the conibear type comprising the steps of engaging a ring engaging member secured to the distal end of a cord and cable, through the top ring of one of the hairpin type springs and then through the bottom ring thereof, positioning said ring engaging member to prevent disengagement thereof from said bottom ring, engaging the windlass portion of a hand crank across the top ring with the cord or cable extending upwardly from the ring engaging member, through said bottom ring, and through said top ring and being secured to said windlass portion, rotating said crank with said windlass portion acting as a fulcrum across said upper ring, thereby winding said cord or cable upon said windlass portion and drawing said rings together and then detachably locking the arms carrying the rings, in the closed position, and then repeating the process on the opposite hairpin type spring.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a view of a conibear type trap in the sprung position showing the invention installed thereon.

FIG. 2 shows the trap of FIG. 1 with both springs detachably secured in the closed position.

FIG. 3 is an isometric view of the invention per se.

In the drawings like characters of reference indicate corresponding parts in the different figures.

DETAILED DESCRIPTION

Proceeding therefore to describe the invention in detail, reference to the drawings will show a conibear type trap collectively designated 10 which consists of a pair of rectangular frames 11 and 12 pivotally interconnected together as at 13, intermediate the ends of opposing sides 11A and 12A.

Heavy duty hairpin type springs 14 are provided, each spring including the coiled end portion 15, opposing arms 16 extending from the ends of the coil and the side member engaging rings 17 on the distal ends of the arms.

When in the sprung position shown in FIG. 1, the upper ring specifically designated 17A engages around the side members of the two frames adjacent the upper ends thereof and the lower ring 17B engages around the members adjacent the lower ends thereof with the spring extended as shown.

When in the set position shown in FIG. 2, the frames are pivoted through 90° thus enabling the two rings 17A and 17B to be moved together whereupon the arms 16 are detachably held in the closed position by means of U-shaped clips 18 engaging around the arms as clearly shown in FIG. 2. Normally, these U-shaped clips 18 are engaged around one of the arms 16 and clinched so that although it can pivot freely on the arm, it cannot be disengaged therefrom.

The device collectively designated 19 is shown in detail in FIG. 3 and is used to draw the rings 17A and 17B together from the position shown in FIG. 1 to the position shown in FIG. 2 so that the U-shaped clips 18 can be engaged as shown in FIG. 2. This enables the trigger assembly 20A and 20B pivotally extending from one of the cross bars 21 of frame 12 to be detachably engaged over the cross bar 21A of the frame 11 as shown in FIG. 2, whereupon the U-shaped clips 18 can be removed.

The invention consists of a crank 20 having a hand engaging portion 21, an intermediate portion 22 and a distal end or windlass portion 23 with portions 21 and 23 being spaced and parallel and offset one with the other.

A flexible cable or cord 24 is engaged through an aperture in a flattened portion 25 intermediate the ends of the windlass portion 23 and is secured in position by means of knot 26 or other well known means.

A spring ring engaging member 27 is secured to the distal end of the cord or cable 24 and one method of securing this member is shown in FIG. 3. An apertured washer 28 is welded intermediate the ends of a cross bar portion 29 and the distal end of the cord or cable 24 engages through the aperture and is secured by means of knot 26A or other similar well known means.

The ends 30 of the cross bar are curved or turned upwwardly as clearly shown in FIG. 3.

In operation, reference should be made to FIG. 1 in which the member 27 has been engaged downwardly through the top loop 17A of the hairpin type spring 14 and then engaged through the lower loops 17B. It is then turned so that the curved junctions 31 between the upturned ends 30 and the ends of cross bar 29 engage one upon each side of the underside of the ring 17B thus preventing disengagement of the member 27 through the ring 17B. The cord or cable 24 extends upwardly through the lower ring 17B and through the upper ring 17A.

The distal end portion or windlass portion 23 of the crank is engaged across the top surface of the upper ring 17A so that the ring acts as a fulcrum. Rotation of the crank by means of the handle portion 21, winds the cord or cable around the portion 23 thus effectively shortening the cord or cable and drawing the two rings 17A and 17B together easily and safely until the U-shaped clip 18 can be engaged around the two legs to hold the spring in the inoperative position shown in FIG. 2.

The process is repeated with the other hairpin type spring whereupon the frame members can be pivoted through 90° and the trigger assembly 20 can be set as shown in FIG. 2. When the trap has been positioned where desired, the U-shaped clips 18 are carefully disengaged from the legs and the trap is in the "set" position.

It will therefore be seen that a device and method is provided which enables the two distal ends of the hairpin type springs to be drawn together readily and easily and with perfect safety so that the U-shaped clips can be engaged therearound whereupon the cross piece or member 27 can be manipulated upwardly through the two rings and the device disengaged from the trap.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a trap of the conibear type which includes a pair of substantially rectangular frames pivotally interconnected with one another intermediate the ends of opposing sides thereof, a heavy duty hairpin type spring assembly operatively connected with the said opposing sides to move the frames from the set position to the sprung position, said spring having a pair of arms with frame side engaging rings secured to the distal ends thereof; a trap setting device, said device comprising a crank handle having a hand engaging portion, an intermediate portion extending from one end of said hand engaging portion and a distal end portion spaced and parallel to said hand engaging portion and extending offset from the other end of said intermediate portion, a winding cord or cable secured by one end to intermediate the ends of said distal end portion and a spring ring engaging member on the distal end of said cord or cable.

2. The device according to claim 1 in which said ring engaging member includes a cross bar and upturned ends on each end of said cross bar, said cord or cable securing to said cross bar intermediate the ends thereof.

3. The combination of a conibear type trap and a trap setting device, said trap including a pair of substantially rectangular frames pivotally interconnected intermediate the ends of opposing sides, a heavy duty hairpin type spring assembly operatively connected with the said opposing sides to move the frames from the set position to the sprung position, said springs including a pair of arms with frame side engaging rings secured upon the distal ends thereof, a trap setting device, said device including a crank handle having a hand engaging portion, an intermediate portion extending from one end of said hand engaging portion, and a distal end portion spaced and parallel to said hand engaging portion and extending from the other end of said intermediate portion, a winding cord or cable secured by one end to intermediate the ends of said distal end portion and a spring ring engaging member on the distal end of said cord or cable.

4. The combination according to claim 3 in which said ring engaging member includes a cross bar and upturned ends on each end of said cross bar, said cord or cable securing to said cross bar intermediate the ends thereof.

5. A trap setting device for conibear type traps comprising in combination a hand crank member including a hand turning portion and an offset windlass portion, a winding cord or cable secured by one end thereof to said windlass portion intermediate the ends thereof and a trap spring ring engaging portion secured to the distal end of said cord or cable.

6. The ring engaging member according to claim 5 in which said ring engaging member includes a cross bar and upturned ends on each end of said cross bar, said cord or cable secured to said cross bar intermediate the ends thereof.

7. A method of setting traps of the conibear type comprising the steps of engaging a ring engaging member secured to the distal end of a cord and cable, through the top ring of one of a hairpin type spring of said conibear trap and then through the bottom ring thereof, positioning said ring engaging member to prevent disengagement thereof from said bottom ring, engaging the windlass portion of a hand crank across the top ring with the cord or cable extending upwardly from the ring engaging member, through said bottom ring, and through said top ring and being secured to said windlass portion, rotating said crank with said windlass portion acting as a fulcrum across said upper ring, thereby winding said cord or cable upon said windlass portion and drawing said rings together and then detachably locking the arms carrying the rings, in the closed position, and then repeating the process on an opposite hairpin type spring.

* * * * *